Patented Nov. 16, 1926.

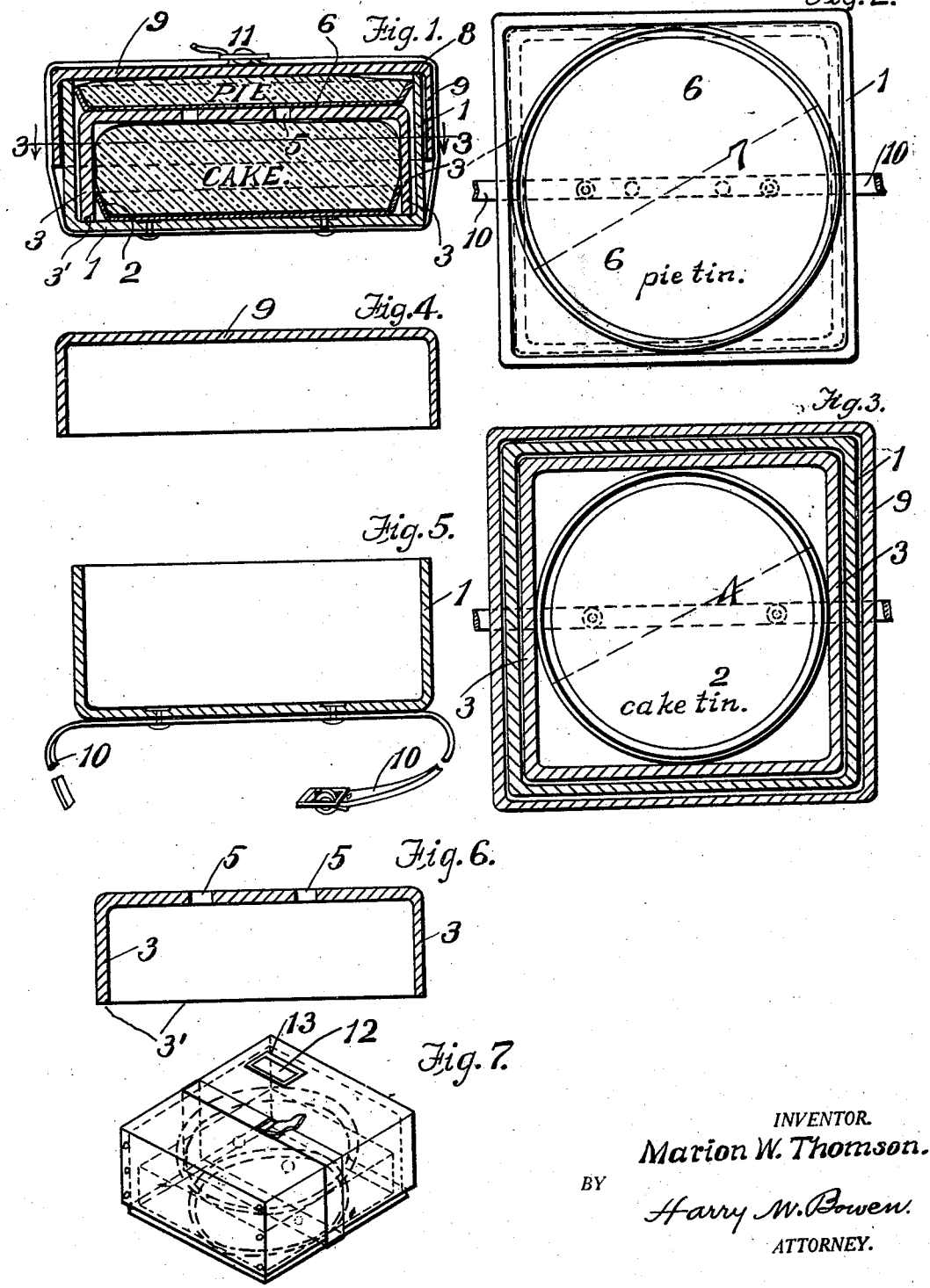

1,607,024

UNITED STATES PATENT OFFICE.

MARION W. THOMSON, OF SPRINGFIELD, MASSACHUSETTS.

MAILING BOX FOR PASTRY.

Application filed October 30, 1922. Serial No. 598,040.

This invention relates to improvements in containers for sending cakes and pies through the mail.

An object of the invention is to provide a suitable container or receptacle for shipping, or sending, by parcel post, cakes and pies or other pastry products through the mail. The construction and arrangement of the various parts which go to make up the container is such that a cake and pie will reach its destination in practically the same perfect condition as it was when placed in the mails or when packed.

Broadly considered my invention comprises an outer or bottom member for receiving a cake tin and a cake thereon, an inverted telescoping member arranged within this outer member and over the cake therein the dimensions of the inverted member being substantially equal to the outer dimensions of the tin in order that the tin will be prevented from lateral movement. When assembled within the outer member the upper surface of the inverted telescoping member is designed to receive a second tin, as a pie tin, thereon and a cover member designed to be placed in telescopic relation over the outer or bottom member, and securing means for retaining the different members in relation to each other so that they will not move relative to each other during shipment whereby the contents of the receptacle will remain therein without moving or displacement, as will be fully described in the body of the specifications.

Referring to the drawings:

Fig. 1 is a sectional view on a vertical plane passing through the diameter of the tins therein on which is placed a cake and a pie and a strap for securing the members together.

Fig. 2 is a plan view with the cover removed and indicating a pie tin therein.

Fig. 3 is a sectional plan view on the line 3—3 of Fig. 1 showing the three telescoping members in section and the cake tin in plan view.

Fig. 4 is a detail sectional view of the cover separated from the other two members.

Fig. 5 is a detail sectional view of the outer bottom member showing the securing strap or band attached thereto.

Fig. 6 is a detail sectional view of the inverted telescoping member which fits over the edge of the cake tin, and Fig. 7 is a perspective view of the assembled container.

Referring to the drawings in detail:

1 designates the outer or bottom member of the container for receiving the cake tin 2 which, as shown, rests on the bottom of the inside surface of the member. 3 is the inverted telescoping member which fits over and engages the edge of the cake tin, the diameter of which is substantially equal to the diameter of the outer rim of the cake tin as indicated by the dotted diametrical line 4 in Fig. 3. The vertical height of this telescoping member 3 is such that with the thickness of the cake shown its lower edge 3' will rest on the bottom of the outer casing 1. In the telescoping member 3 is formed the two openings 5 for inserting the thumb and finger, or any suitable implement for the purpose of removing the telescoping member 3. 6 indicates the pie tin that rests, as shown, upon the upper surface of the inverted member 3 and the diameter of this tin is such that it is equal to the inside diameter of the member 1 as indicated in Fig. 2 by the numeral 7 on the dotted line. The height of the member 1 is substantially equal to the combined height of the member 3 and the thickness or height of the pie and tin indicated, or in other words the upper surface of the pie is substantially in the same horizontal plane as the upper edge 8 of the member 1. The pie receiving space is therefore formed between the upper edge 8 and the top surface of the inverted member 3. For the purpose of inclosing the contents, a cover 9 is provided which is inverted and placed over the outside of the member 1 so that it rests upon the upper edge 8, as shown. 10 designates a flexible band or strap composed of webbing or other suitable material for retaining the contents of the container and the member 3 in place and for the purpose of preventing any lateral or vertical movement of the pie or cake tins as well as the contents of the tins. This strap or securing member is formed with a suitable buckle or clasp 11 whereby the ends may be readily drawn together and the band tightened.

It is to be understood that I do not limit myself to any particular material of which the different members of the container are composed but I prefer to use a material known as "linen fiber" which is light in weight and strong and suitably treated to make it water proof. For the purpose of mailing or shipping the container through the mail a suitable tag indicated at 12 is provided. This tag is designed to be placed in a holder 13 with the return address on the reverse side.

What I claim is:

A shipping container for sending a cake and a pie through the mails, comprising two open ended members, designed to be closely nested one within the other, the inner lower nested member being arranged in an inverted position with its lower edge resting upon the bottom of the outer member to provide a space in the lower nested member for receiving a circular shaped cake tin and cake thereon, the upper bottom surface of the inner inverted member being below the upper edge of the outer nesting member, the said surface being designed to receive another circular shaped tin, as a pie tin and pie thereon, a cover member extending over the outer nesting member to enclose the pie receiving space, and means for securing the members together comprising a strap which is secured to the outer bottom surface of the outer nesting member and carried upward and its ends secured together above the upper top surface of the cover member, the construction and arrangement being such that the lateral dimensions of the said spaces permits the circular cake and pie tins to fit into these spaces without lateral movement, and the vertical dimensions are such that the cake and pie therein respectively fills the vertical spaces.

MARION W. THOMSON.